US007123389B2

(12) United States Patent
Yui

(10) Patent No.: US 7,123,389 B2
(45) Date of Patent: Oct. 17, 2006

(54) IMAGE READING UNIT AND IMAGE READING APPARATUS USING THE SAME

(75) Inventor: Kenichi Yui, Kofu (JP)

(73) Assignee: Nisca Corporation, Yamanashi-Ken (JP)

( * ) Notice: Subject to any disclaimer, the term of this patent is extended or adjusted under 35 U.S.C. 154(b) by 879 days.

(21) Appl. No.: 10/143,847

(22) Filed: May 14, 2002

(65) Prior Publication Data

US 2002/0167689 A1 Nov. 14, 2002

(30) Foreign Application Priority Data

May 14, 2001 (JP) ............................. 2001-143205
Apr. 16, 2002 (JP) ............................. 2002-113057

(51) Int. Cl.
*H04N 1/04* (2006.01)
(52) U.S. Cl. ...................... 358/496; 358/481; 358/494; 358/474
(58) Field of Classification Search ................ 358/474, 358/475, 484, 491, 494, 496, 497, 481; 250/208.1
See application file for complete search history.

(56) References Cited

U.S. PATENT DOCUMENTS 5,995,244 A * 11/1999 Tsai ........................... 358/474

FOREIGN PATENT DOCUMENTS

JP 06-086013 3/1994
JP 07-170376 7/1995
JP 11-088605 3/1999

OTHER PUBLICATIONS

Patent Abstract of Japan, No. 09-269996, Publication Date Oct. 14, 1997, Applicant: NEC Home Electron Ltd.
Patent Abstract of Japan, No. 07-170376, Publication Date Jul. 4, 1995, Applicant: TTT KK.
Patent Abstract of Japan, No. 09-069915, Publication Date Mar. 11, 1997, Applicant: Toshiba Corp. Toshiba Commun. Technol. KK.
Patent Abstract of Japan, No. 63-059259, Publication Date Mar. 15, 1988, Applicant: Asahi Optical Co., Ltd.

* cited by examiner

*Primary Examiner*—Jerome Grant, II
*Assistant Examiner*—Houshang Safaipour
(74) *Attorney, Agent, or Firm*—Manabu Kanesaka

(57) ABSTRACT

An image reading unit includes a light source for illuminating a document, a plurality of reflecting devices for reflecting the light from the document, a condensing device for condensing the light reflected by the reflecting devices, and a reading device disposed at a condensing position at a rear side of the condensing device. The light source is disposed at a forward side of the condensing device. A plurality of reflecting devices includes a final reflecting device and a reciprocating reflecting device. The final reflecting device forms a linear optical path together with the reading device, and the reciprocating reflecting device forms at least one reciprocating optical path crossing the linear optical path between the condensing device and the reading device. Accordingly, the image reading unit can be made small.

13 Claims, 8 Drawing Sheets

IMAGE READING UNIT AND IMAGE READING APPARATUS USING THE SAME

BACKGROUND OF THE INVENTION AND RELATED ART STATEMENT

The present invention relates to an image reading unit and an image reading apparatus provided with the same, in which a light reflected from an original document through a plurality of reflecting devices is condensed or focused and reduced by a condensing device, to thereby read an image on the document by a reading device.

In a general image reading unit or image reading apparatus using the same, which reads an image on a document by reducing a size thereof, it is necessary to secure a predetermined optical path length in order to read the image of the document. The optical path is required to have a certain length from a document reading position to an image sensor, depending on a width of the document, a lens as a condensing device, and the image sensor such as a charge coupled device (CCD) as a reading device. Therefore, in a conventional apparatus, in order to make the apparatus small while the predetermined optical length is secured, a plurality of reflecting devices such as mirrors is used for reflecting the light from the document several times.

As the conventional image reading apparatus or the conventional image reading unit described above, there have been known an image reading unit and image reading apparatus disclosed in Japanese Patent Publication (KOKAI) No. 63-59259 and Japanese Patent Publication (KOKAI) No. 09-69915. Each of these image reading units includes a light source for irradiating light to an image surface of the document; a plurality of reflecting mirrors for reflecting the light irradiated from the light source and reflected from the document; a condenser lens for receiving the light reflected from the document through the reflecting mirrors to thereby condense the light; and an image sensor for converting the reflected light passing through the condenser lens into an electric signal to read the image.

In the image reading unit disclosed in Japanese Patent Publication (KOKAI) No. 63-59259, a pair of reflecting mirrors is provided above the condenser lens, and while the predetermined optical path length is secured by reflecting the light reflected from the document several times between the reflecting mirrors of the pair, it has been tried to reduce the size of the image reading unit. Also, in the image reading unit disclosed in Japanese Patent Publication (KOKAI) No. 09-69915, a plurality of mirrors is disposed below the lens, and by changing the optical path direction below the lens, it has been tried to make the image reading unit small while the predetermined optical path length is secured.

In the conventional units described above, however, it is necessary to have a space for providing the mirrors disposed above or below the lens and the optical paths reflected by the respective mirrors. Therefore, according to the conventional structures, it is difficult to further reduce the size of the image reading unit, especially, to make a thinner unit.

The present invention has been made in view of the above problems in the prior arts, and an object of the invention is to provide an image reading unit and an image reading apparatus provided with the same, in which a reciprocating optical path is formed between a condenser lens and an image sensor to make the reading unit small.

Further objects and advantages of the invention will be apparent from the following description of the invention.

SUMMARY OF THE INVENTION

To achieve the aforementioned object, the first aspect of the present invention provides an image reading unit for reading an image on a document having a light source for irradiating a light to the document; a plurality of reflecting devices for reflecting the light from the document; a condensing device for condensing the light reflected by the reflecting devices; and a reading device disposed at a light condensing position (a focal point) located at a rearward side of a light outgoing surface of the condensing device. The light source is disposed at a forward side of an incident surface of the condensing device. A plurality of the reflecting devices is formed of a final reflecting device and a reciprocating reflecting device. The final reflecting device is located at a forward side of the incident surface of the condensing device, and reflects the light from the document through a plurality of the reflecting devices toward the reading device. The final reflecting device forms a linear optical path between the final reflecting device and the reading device, which passes through the condensing device. The reciprocating reflecting device forms at least one reciprocating optical path between the condenser device and the reading device, and crosses the linear optical path.

According to the present invention formed by the above structure, since the image reading unit is provided with the reciprocating reflecting device forming at least one reciprocating optical path, which is located between the condenser device and the reading device and crosses the linear optical path, it is not necessary to provide an additional separate space for bending or winding the optical path. Therefore, a size of the image reading unit can be reduced.

Also, it is preferable that at least one shielding member for preventing undesired light from being incident on a light receiving surface of the reading device is provided between the condensing device and the reading device. Alternatively, it is preferable to provide a shielding member for covering the light receiving surface of the reading device. Generally, when the reciprocating optical path is formed between the condensing device and the reading device, the undesired light affecting the image quality is likely to be incident on the light receiving section of the reading device. However, by providing the shielding member as described above, the possibility of the undesired light being incident on the light receiving section of the reading device can be reduced.

Further, the image reading unit according to another aspect of the invention is formed of a light source for irradiating a light to a document; a plurality of reflecting devices for reflecting the light from the document; a condensing device for condensing the light through a plurality of the reflecting devices; a reading device disposed at a light condensing position located at a rearward side of a light outgoing surface of the condensing device; and a final reflecting device, which is located at a forward side of the incident surface of the condensing device and reflects the light reflected by a plurality of reflecting devices toward the reading device. The final reflecting device forms a linear optical path between the final reflecting device and the reading device, which passes through the condensing device. A plurality of the reflecting devices is formed of the first reflecting device, a reciprocating reflecting device, and the second reflecting device. The first reflecting device is disposed above or below the linear optical path. The first reflecting device receives the light from the document, and reflects in a direction substantially parallel to the linear optical path. The reciprocating reflecting device receives the light reflected from the first reflecting device, and forms at least one reciprocating optical path, which is located between the condenser device and the reading device and crosses the linear optical path. The second reflecting device is disposed above or below the linear optical path such that the second reflecting device is located at the same side as the first reflecting device. The second reflecting device reflects the light from the reciprocating reflecting device toward the final reflecting device.

According to the structure of the another aspect of the invention, as in the first aspect of the invention, the image reading unit is provide with the reciprocating reflecting device for forming at least one reciprocating optical path, which is located between the condensing device and the reading device and crosses the linear optical path. Therefore, it is not necessary to provide an additional separate space for bending or winding the optical path, resulting in reducing the size of the image reading apparatus. Further, the first reflecting device for reflecting the light from the document toward the reciprocating reflecting device is disposed above or below the linear optical path, and the second reflecting device for receiving the light from the reciprocating reflecting device and reflecting the received light toward the final reflecting device is also disposed above or below the linear optical path, such that the second reflecting device is located on the same side as the first reflecting device. Accordingly, the optical path substantially parallel to the linear optical path can be formed at only one side, that is, one of the side above the linear optical side and the side below the linear optical side. Therefore, the size of the image reading apparatus can be further reduced.

Also, in the image reading unit according to another aspect of the invention, since the light source is disposed at the forward side or ahead of the light outgoing surface of the condensing device, the light from the light source is prevented from being incident on the reading device. Therefore, much more excellent image data can be obtained.

In the image reading unit according to another aspect of the invention, it is also preferable that at least one shielding member for preventing the undesired light from being incident on the light receiving section of the reading device is provided between the condensing device and the reading device. Alternatively, it is preferable to provide the shielding member for covering the light receiving surface of the reading device.

Also, an image reading apparatus according to the present invention is formed of a platen for supporting the document thereon and an image reading unit for reading the document on the platen, and the image reading unit is formed of the image reading unit according to the present invention structured as describe above. Accordingly, the size of the entire image reading apparatus can be reduced.

DETAILED DESCRIPTION OF PREFERRED EMBODIMENTS

Figure 1:
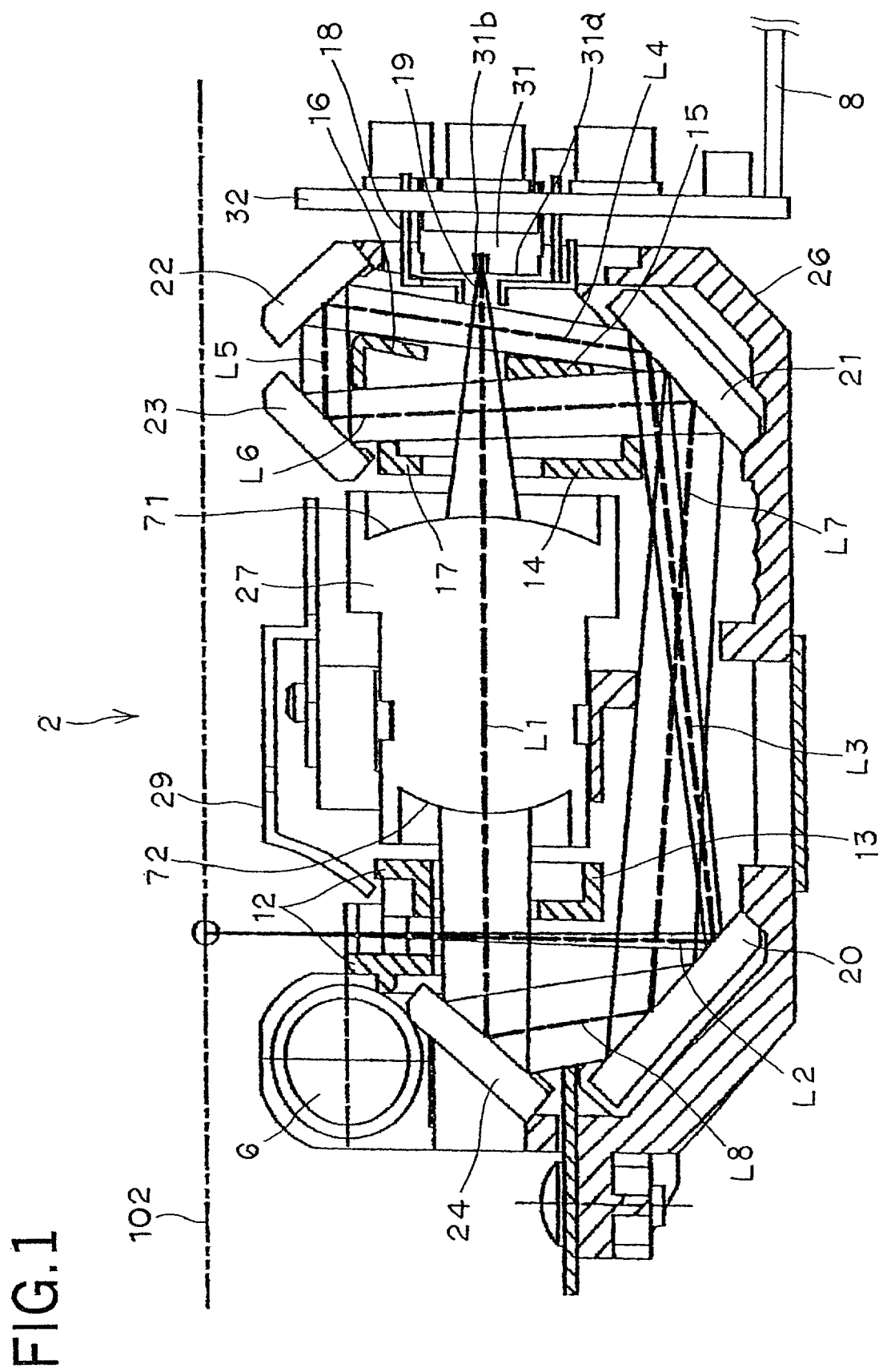
FIG. 1 is a sectional view showing an image reading unit according to the first embodiment of the present invention.
Figure 2:
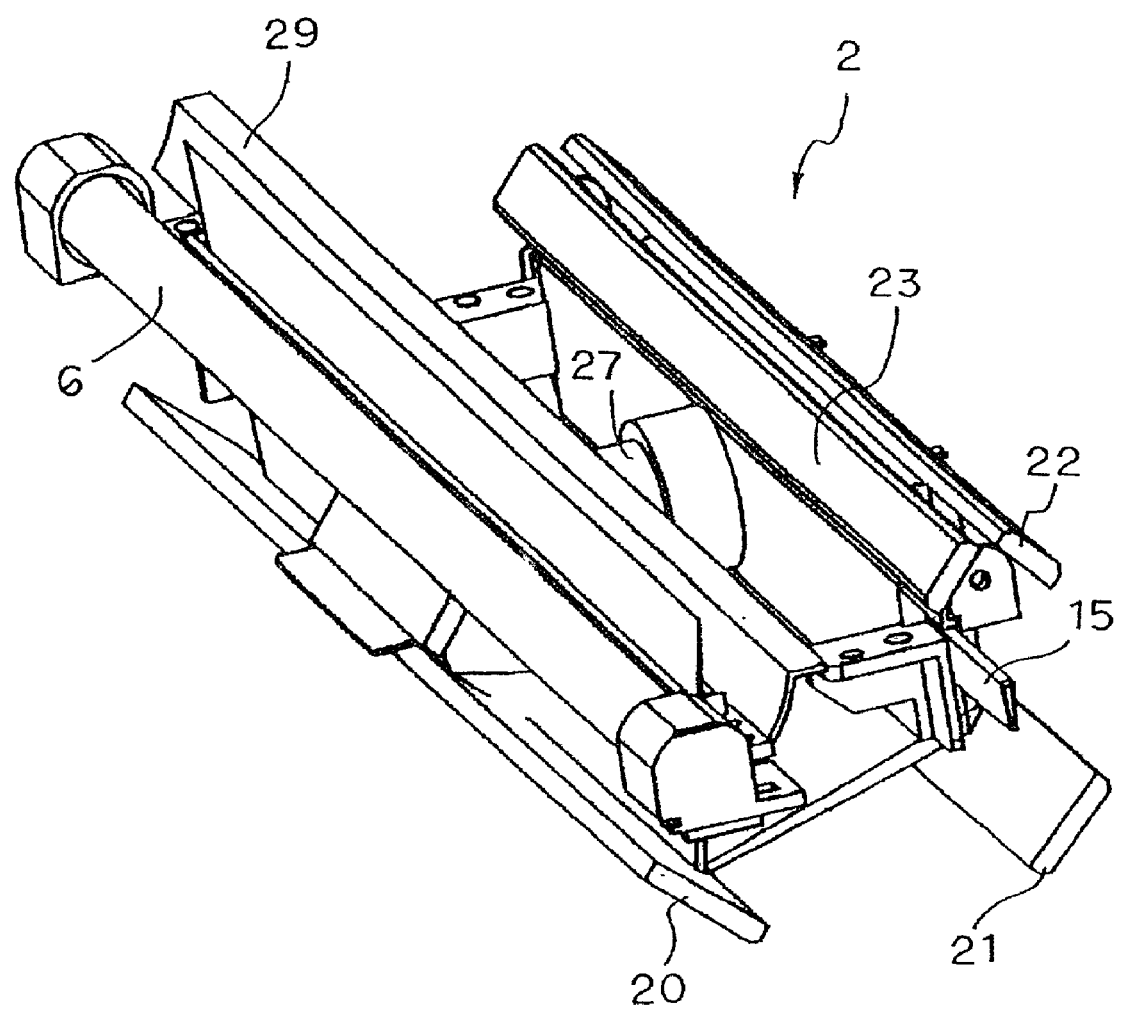
FIG. 2 is a perspective view showing a condition that a reflecting device of the image reading unit according to the first embodiment of the present invention is attached.
Figure 3:
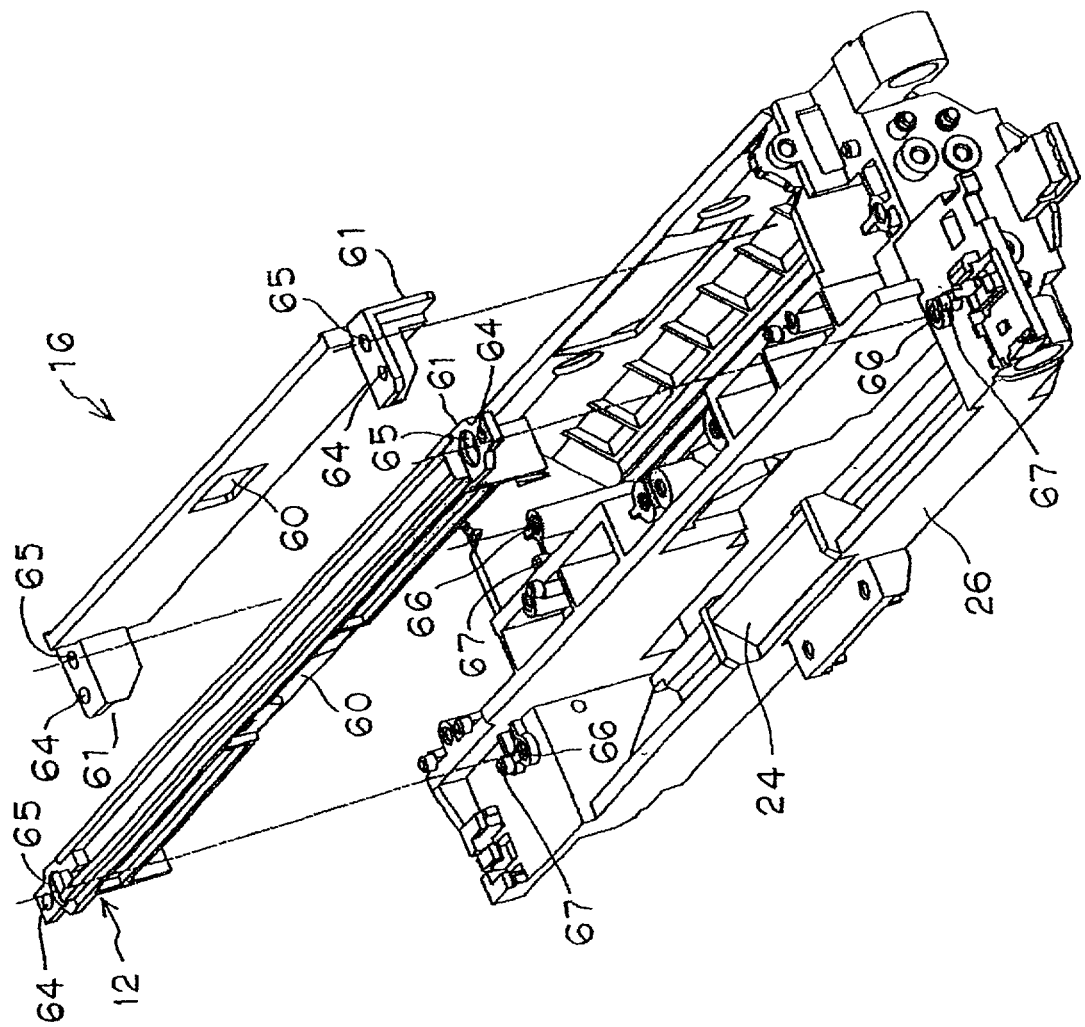
FIG. 3 is a perspective view showing shielding members attached to the inside of the image reading unit according to the first embodiment of the present invention, as seen from an upper left side.

The present invention relates to an image reading unit applied to various types of copiers, facsimile and image scanners connected to electronic appliances, and an image reading apparatus provided with such an image reading unit. Hereunder, an image reading unit and an image reading apparatus according to the present invention will be explained with reference to the accompanying drawings. Firstly, an image reading unit according to the first embodiment of the present invention will be explained in detail with reference to the drawings. FIG. 1 is a sectional view of the image reading unit according to the first embodiment of the invention. FIG. 2 is a perspective view of the image reading unit according to the first embodiment of the invention as seen from an upper left. FIG. 3 is a perspective view of the image reading unit to show a method of attaching shielding members.

As shown in FIG. 1 and FIG. 2, an image reading unit 2 includes a rod-like light source 6, such as a fluorescent lamp or xenon lamp, for illuminating the light to a document surface of an original document 102; a plurality of reflecting means for reflecting the image light reflected from the document surface illuminated by the light source 6 to change the traveling path of the image light; a reflecting mirror 24 as final reflecting means for reflecting the image light from a plurality of reflecting means; a condenser lens 27 as condensing means for condensing the image light from the reflecting mirror 24 to form the image; and an image sensor 31 as reading means disposed at the condensing position of the condenser lens 27 to read the image light from the document.

A plurality of reflecting means described above is formed of a reflecting mirror 20 (the first and second reflecting means), a reflecting mirror 21 (the third reflecting means), a reflecting mirror 22 (the fourth reflecting means), and a reflecting mirror 23 (the fifth reflecting means). The reflecting mirrors 21, 22 and 23 form reciprocating reflecting means for forming the reciprocating optical path. In the present invention, the reflecting mirrors 20, 21, 22, 23 and 24 may include a concept or a member including prisms or the like for changing a direction of an optical path. Also, the reciprocating optical path includes an optical path in which the light proceeds from a side below a linear optical path L1, described later, to a side above the linear optical path L1, and then returns to the side below the linear optical path L1, or an optical path in which the light proceeds from the side above the linear optical path L1 to the side below the linear optical path L1, and then returns to the side above the linear optical path L1. The embodiment of the invention uses the former reciprocating optical path.

Figure 5:
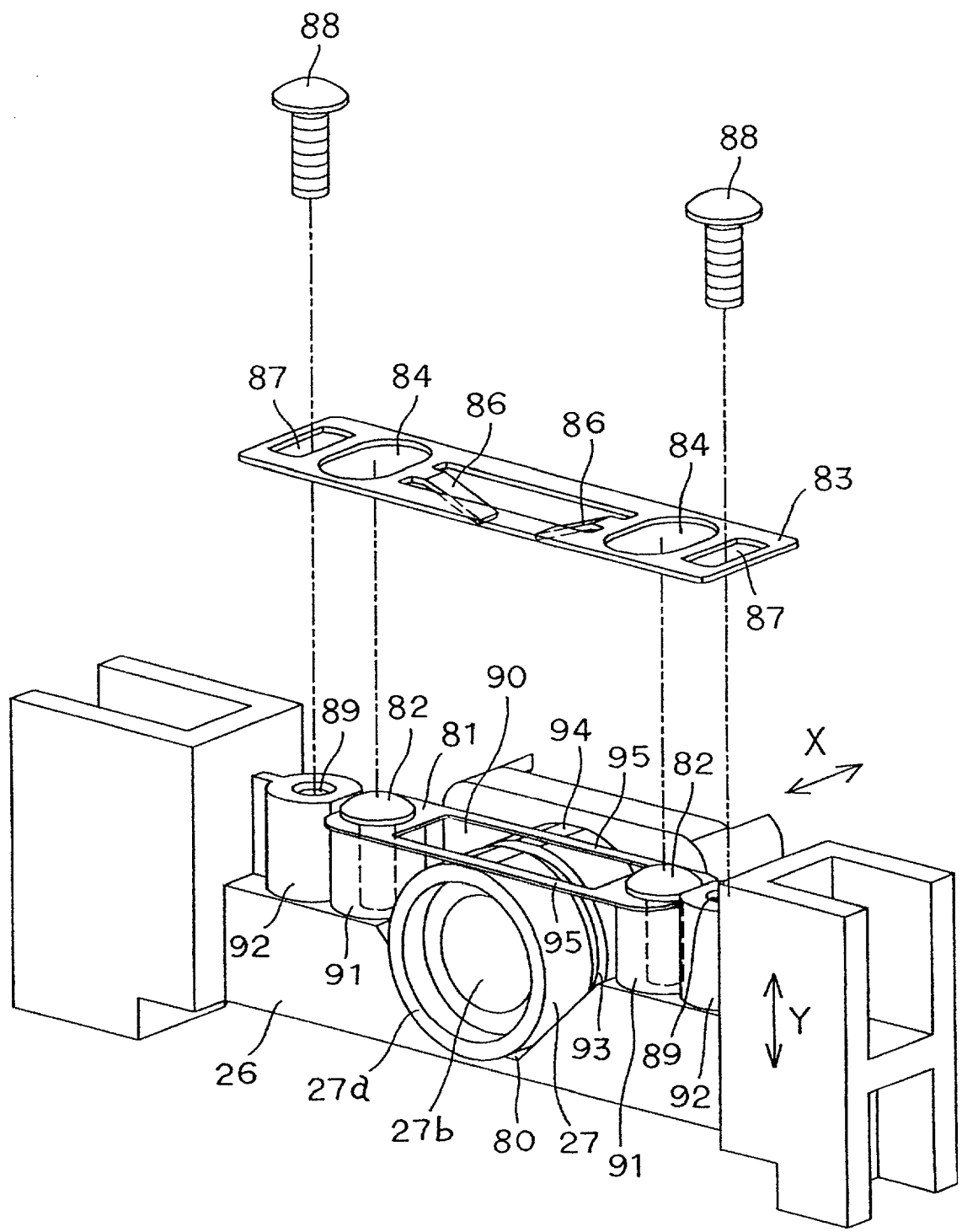
FIG. 5 is a perspective view showing a method of attaching and adjusting a condensing device according to the present invention.

The condenser lens 27 constitutes an integral lens unit formed of a lens holder 27a and at least one lens 27b accommodated in the lens holder 27a (refer to FIG. 5).

The image sensor 31 is disposed at a condensing (image-forming) position or a focal point of the condenser lens 27 located at a rearward side of a light outgoing surface 71 of the condenser lens 27. The image sensor 31 is formed of a line-like or linear image sensor having a plurality of photoelectric conversion elements, such as CCDs, to thereby convert the image light reflected from the document into an electric signal. A sensor board 32 (supporting means) supports the image sensor 31. An element for amplifying and shaping the electric signal from the image sensor 31 and an analog-to-digital conversion element for converting the electric signal into a digital signal are mounted on the sensor board 32. The image light from the document is converted into the digital signal, and transferred to an external device through a signal cable 8 connected to the sensor board 32. Also, as shown in FIG. 2 and FIG. 3, the light source 6, the reflecting mirrors 20, 21, 22, 23 and 24, the condenser lens 27 and the sensor board 32 are fixed and supported at a unit frame 26 as a supporting member formed of a resin or the like by using a generally known mounting method such as screws, to thereby form the integral image reading unit 2 as a single unit.

As shown in FIG. 1, the light source 6 is disposed at a forward side of a light incoming surface 72 of the condenser lens 27, in such a configuration that the condenser lens 27 is disposed between the image sensor 31 and the light source 6. Therefore, the light beam from the light source is prevented from being directly incident on the image sensor 31. Accordingly, a problem such as ghost can be prevented, and malfunctions due to an elevated temperature of the image sensor 31 caused by the heat of the light source 6 can be decreased.

Now, methods of attaching and adjusting the condenser lens 27 will be explained with reference to FIG. 5.

As described above, the condenser lens 27 is the unit formed of at least one lens 27b, and a cylindrical lens frame 27a accommodating the lens 27b. The condenser lens 27 is fixed to a V-shaped groove 80 formed on the unit frame 26 by using two flat springs 81 and 83. The lens frame 27a includes a groove 93 formed along an outer periphery thereof, and a plane or flat section 94 with a narrow width formed in a longitudinal direction of the lens frame 27a.

The flat spring 81 is formed of an elastic metal plate, and a rectangular hole 90 is formed at the center of the flat spring 81. The screws 82 fix the flat spring 81 to fixing members 91, which are integrated with the unit frame 26 and have holes for screws at central sections thereof. An upper surface of the fixing members 91 is set to be lower than the plane section 94 of the condenser lens 27 placed on the V-shaped grove 80. Therefore, as shown in FIG. 5, when the condenser lens 27 is placed on the V-shaped groove 80 and the flat spring 81 is fixed from a side above the condenser lens 27, the plane section 94 is pressed by the flat spring 81 from the upper side, so that the condenser lens 27 is in a temporarily fixed state in which the vertical direction thereof shown by an arrow Y in FIG. 5 is fixed.

The flat spring 83 is also formed of an elastic metal plate. The flat spring 83 includes two holes 87 elongated in a direction of an arrow X in FIG. 5; two holes 84 with sizes allowing heads of the screws 82 to pass therethrough and elongated in the direction of the arrow X in FIG. 5; and two engaging members 86 bent downwardly and engaging with the groove 93 in the condenser lens 27. The flat spring 83 is fixed to the fixing members 93, which are integrated with the unit frame 26 and have holes 89 for screws at central sections thereof, by inserting the screws 88 into the elongate holes 87. When the flat spring 83 is temporarily fixed to the condenser lens 27 from a space above the condenser lens 27 as described above, the engaging members 86 engage with the groove 93 of the condenser lens 27, so that the condenser lens 27 is in a state that the direction thereof shown by the arrow X in FIG. 5 is fixed. Accordingly, the condenser lens 27 is fixed both in the vertical direction shown by the arrow Y and in the front and rear directions shown by the arrow X.

Next, an adjustment of the condenser lens 27 in the front and rear direction (the arrow X) will be explained.

In order to adjust the condenser lens 27 in the front and rear direction (the arrow X), firstly, the screws 88 are loosened so that the flat spring 83 can slide in the direction of the arrow X. At this point, since the flat spring 81 fixes the condenser lens 27, the vertical direction of the condenser lens 27 shown by the arrow Y in FIG. 5 remains fixed. Then, when the flat spring 83 is moved in the front and rear direction, since the engaging members 86 engage with the groove 93 of the condenser lens 27, the condenser lens 27 is moved in the front and rear direction. Thereafter, when the condenser lens 27 is properly focused, the screws 88 are tightened to fix the condenser lens 27.

As described above, since the position (focus) adjustment of the condenser lens 27 can be operated from the upper side of the image reading unit 2 in the embodiment of the invention, the adjustment of the condenser lens 27 can be done in the same state where the unit is actually reading an image on the document. In an image reading unit structured such that the adjustment of the lens is operated from a space below the image reading unit, for example, it is necessary to do the adjustment by turning the image reading unit upside down, or it is necessary to do the adjustment from the space below the image reading unit while the unit is in an actual operation.

If it is necessary to turn the unit upside down, although the workability is good, the condenser lens and the reflecting mirrors may be shifted from the predetermined positions in a vertical direction. Since the adjustment of the lens is carried out while these components are shifted, there is a problem that when the image reading unit is returned to the normal state by turning the unit upside down again, the lens is out of focus. Therefore, in the case of adjusting the lens by turning the unit upside down, it is necessary to adjust the position of the lens in consideration of the shifts caused by turning the unit upside down, thus the adjustment is difficult.

Also, in the case that the adjustment of the lens is operated from the space below the unit during an actual operation without turning the image reading unit upside down, it is necessary to arrange the image reading unit itself at the higher location to thereby operate the adjustment of the lens from the space below the unit, so that the workability is poor.

In the embodiment of the invention, fixing and adjusting the condenser lens 27 can be operated while the posture of the image reading unit 2 remains the same as in the actual reading operation. Therefore, the adjustment of the condenser lens 27 is facilitated, and the workability of the adjustment is improved.

Next, arrangement of the respective reflecting mirrors and the optical paths will be explained.

The reflecting mirror 24 is provided at a forward side of the incident surface 72 of the condenser lens and above the reflecting mirror 20, described later. The image light from the document, which is reflected by the reflecting mirrors 20, 21, 22, 23, is reflected by the reflecting mirror 24 toward the image sensor 31 positioned in the rearward side of the light outgoing surface 71. The image light reflected toward the image sensor 31 passes through the condenser lens 27 to thereby create an image on a light receiving section 31b of the image sensor 31. A linear optical path L1, which is straight, is formed between the reflecting mirror 24 and the image sensor 31.

In order to receive the reflected light from the document 102, the reflecting mirror 20 is positioned below the document 102 (reading position) and the light source 6 as well as the linear optical path L1. Further, the reflecting mirror 20 is located below the reflecting mirror 24 and the forward side of the incident surface 72 of the condenser lens 27. The reflecting mirror 21 is positioned below the linear optical path L1 as well as between the light outgoing surface 71 of the condenser lens 27 and the sensor board 32. Also, the reflecting mirrors 22 and 23 are disposed between the light outgoing surface 71 and the sensor board 32 and above the linear optical path L1. The reflecting mirrors 22 and 23 are respectively opposed to the reflecting mirror 21 with respect to the linear optical path L1 located between the reflecting mirrors 22, 23 and the reflecting mirror 21.

As shown in FIG. 1, the image light from the document surface irradiated by the light source 6 proceeds downward in a vertical direction, and is incident on the reflecting mirror 20. The image light incident on the reflecting mirror 20 is reflected toward the reflecting mirror 21 disposed at a side of the reflecting mirror 20, and proceeds below the condenser lens 27 in a direction substantially parallel to the linear optical path L1 to be incident on the reflecting mirror 21. The image light incident on the reflecting mirror 21 is reflected toward the reflecting mirror 22 disposed above the reflecting mirror 21, and proceeds between the condenser lens 27 and the image sensor 31 by crossing the linear optical path L1, to thereby be incident on the reflecting mirror 22. The image light incident on the reflecting mirror 22 is reflected toward the reflecting mirror 23 disposed at a side of the reflecting mirror 22, and proceeds substantially parallel to the linear optical path L1, to thereby be incident on the reflecting mirror 23. The image light incident on the reflecting mirror 23 is again reflected toward the reflecting mirror 21, and proceeds between the condenser lens 27 and the image sensor 31 by crossing the linear optical path L1, to thereby be incident on the reflecting mirror 21. Then, the image light incident on the reflecting mirror 21 is reflected again toward the reflecting mirror 20, and proceeds under the condenser lens 27 to be incident on the reflecting mirror 20. The image light incident on the reflecting mirror 20 is reflected toward the reflecting mirror 24 disposed above the reflecting mirror 20. The image light incident on the reflecting mirror 24 is focused on a surface of the image sensor 31 by the condenser lens 27.

Also, an optical path L2 substantially perpendicular to the linear optical path L1 is formed between the surface of the document and the reflecting mirror 20. An optical path L3, which is located below the condenser lens 27 and the linear optical path L1 and substantially parallel to the linear optical path L1, is formed between the reflecting mirror 20 and the reflecting mirror 21. An optical path L4 crossing the linear optical path L1 is formed between the reflecting mirror 21 and the reflecting mirror 22, and an optical path L5 substantially parallel to the linear optical path L1 is formed between the reflecting mirror 22 and the reflecting mirror 23. An optical path L6 crossing the linear optical path L1 is formed between the reflecting mirror 23 and the reflecting mirror 21, and an optical path L7, which is located below the condenser lens 27 and the linear optical path L1 and substantially parallel to the linear optical path L1 as in the optical path L3, is formed between the reflecting mirror 21 and the reflecting mirror 20. An optical path L8 substantially parallel to the optical path L2 is formed between the reflecting mirror 20 and the reflecting mirror 24. Incidentally, the optical paths L4, L5, and L6 form a single reciprocating optical path. Although the reciprocating path (the optical paths L4+L5+L6) is formed by the three reflecting mirrors 21, 22, 23 in order to further make the device small in the embodiment, the reciprocating optical path may be formed by four reflecting mirrors. Namely, an additional reflecting mirror may be provided at a side of the reflecting mirror 21, and the additional mirror receives the reflected light (the optical path L6) from the reflecting mirror 23 to thereby reflect the light toward the reflecting mirror 20.

Further, shielding members 12 through 18 are attached the inside of the image reading unit 2.

These shielding members 12 through 18 are provided for preventing an unnecessary light that causes a noise in the image data from being incident on the image sensor 31. The unnecessary light includes a scattered light reflected in a direction different from the optical paths by the respective reflecting means or a light entered from the outside of the image reading unit 2, The shielding members 12 through 17 are formed in a plate shape made of a black resin as shown in FIG. 3, for example, and fixed to the unit frame 26.

The shielding members 12 and 16 include a window 60 at a center of a plane portion thereof such that the optical path is allowed to pass through the window 60. Each of the shielding members 12, 16 is provided with ribs 61 at both side surfaces thereof, and holes 64, 65 are formed on the ribs 61. In the shielding members 12, 16, the holes 64 are fitted with projections 67 formed at the unit frame 26 so as to position the shielding member, and the holes 65 are aligned with screw holes 66 formed in the unit frame 26 so as to fixed by screws. Accordingly, the shielding members 12, 16 are fixed to the predetermined positions of the unit frame 26. The shielding members 13 through 17 are fixed to the unit frame 26 by the similar method. Incidentally, the shielding member can be made of a material other than a resin, or color of the shielding member can be other than black as long as the shielding member shields the light. Further, in this embodiment, the shielding members are formed separately from the unit frame 26, however, they may be integrated with the unit frame 26.

As shown in FIG. 1, the shielding member 18 is formed of a metallic plate made of a copper alloy, steel, aluminum alloy or the like, and fixed to the sensor board 21 to thereby entirely cover the side surfaces of the image sensor 31 and the light receiving surface 31a in which the light receiving section 31b is provided. An opening section 19 is formed at a part of the surface of the shielding member 18 to cover the incident surface of the image sensor 31, so that the image light from the condenser lens 27 is incident on the light receiving section 31b of the image sensor 31. A cylindrical projection is formed at an edge of the opening section 19. The opening section 19 is designed to be slightly larger than a width of the image light, which is incident on the light receiving section 31b from the condenser lens 27, so as to prevent a light other than the image light from being incident on the light receiving section 31b. Furthermore, since the shielding member 18 is made of a metal as described above, it also acts as a heat radiating member for radiating the heat generated at the image sensor 31.

As shown in FIG. 1, the shielding member 12 is disposed between the light source 6 and the condenser lens 27 so as to prevent an outside light from an upper side from entering the inside of the image reading unit 2. At the same time, the shielding member 12 prevents the light beam from the light source from being directly incident on the condenser lens 27.

The shielding member 13 is disposed between the reflecting mirror 20 and the condenser lens 27, so as to prevent a scattered light mainly reflected by the reflecting mirrors 20, 24 from being incident on the condenser lens 27. The shielding members 14, 17 are disposed between the optical path L6 and the condenser lens 27. The shielding member 14 prevents a light mainly scattered by the reflecting mirror 21 from being incident on the image sensor 31 through the condenser lens 27, and the shielding member 17 prevents a light mainly scattered by the reflecting mirrors 22, 23 from being incident on the image sensor 31 through the condenser lens 27.

The shielding members 15, 16 are disposed between the optical path L4 and the optical path L6. The shielding member 15 shields an undesired scattered light mainly scattered by the reflecting mirror 21 and entering into the image sensor 31 through the condenser lens 27. The shielding member 16 shields an undesired scattered light mainly scattered by the reflecting mirror 22 and entering into the image sensor 31 through the condenser lens 27, and also shields an undesired scattered light scattered by the reflecting mirror 23 and directly entering the image sensor 31.

As described above, when the reflecting means (the mirrors) 21, 22, 23 are disposed between the condenser lens 27 and the sensor board 32 to form the optical paths between the condenser lens 27 and the image sensor 31, the scattered light caused by the reflecting means is more likely to enter the image sensor 31. However, in the embodiment of the invention, the shielding members 14, 15, 16, 17 are disposed between the condenser lens 27 and the image sensor 31, and the shielding member 18 is directly provided at the image sensor 31, so as to effectively prevent the scattered light from being incident on the image sensor 31.

As described above, in the embodiment, since the reciprocating optical path (the optical paths L4+L5+L6) crossing the linear optical path L1 is formed between the condenser lens 27 and the image sensor 31, it is not necessary to provide an additional space for forming a curved optical path, to thereby make the image reading unit 2 smaller and especially thinner.

Furthermore, in the embodiment, the shielding members 14, 15, 16, 17 are disposed between the condenser lens 27 and the image sensor 31, and the shielding member 18 is disposed on the light receiving surface of the image sensor 31. Therefore, the scattered light caused by the reflecting mirrors 21, 22, 23 is effectively prevented from being incident on the image sensor 31.

Also, in the embodiment, the reflecting mirrors 21, 22, 23 are disposed in the absolutely necessary space between the light outgoing surface 71 and the image sensor 31, to thereby achieve further reduction of the size of the apparatus.

Further, in the embodiment, the light source 6 is disposed at a more forward side than the incident surface 72 of the condenser lens 27, such that the condenser lens 27 is located between the light source 6 and the image sensor 31. Therefore, the light from the light source 6 is prevented from being directly incident on the image sensor 31, and the malfunction of the image sensor 31 caused by high temperature of the image sensor 31 due to the heat of the light source 6 can be decreased.

Also, in the embodiment, the image light from the document 102 is reflected by the reflecting mirror 20, which is disposed below the linear optical path L1 and ahead of the condenser lens 27. Then, the reflected light passes below the condenser lens 27, and is reflected to reciprocate by the reciprocating reflecting means (reflecting mirrors 21, 22, 23). Thereafter, the reflected light passes again below the condenser lens 27, and is incident on the reflecting mirror 20. Then, the reflected light is reflected by the reflecting mirror 24, passes through the condenser lens 27, and is incident on the image sensor 31.

As described above, the reflecting mirror 20 (the first and second reflecting means), the reflecting mirror 21 (the third reflecting means) are disposed below the linear optical path L1, so that the optical paths between the reflecting mirror 20 and the reflecting mirror 21 (the optical path L3 proceeding from the forward side of the condenser lens 27 to the rearward side thereof, and the optical path L7 proceeding from the rearward side of the condenser lens 27 to the forward side thereof) are disposed a side of the condenser lens 27 (and the linear optical path L1) below the condenser lens 27. Thus, since only the reflecting mirrors 20 and 21 need to be disposed in the lower side such that the condenser lens 27 does not interrupt the optical paths L3 and L7, a size of the image reading unit 2 can be further reduced. If the optical paths L3 and L7 are respectively disposed above and below the condenser lens 27, the reflecting mirror 22 or the reflecting mirror 23 needs to be located far above the condenser lens 27 such that the optical path disposed above the condenser lens 27 is not interrupted by the condenser lens 27, resulting in a larger size (thickness) of the image reading unit 2. Therefore, it is clearly demonstrated that reducing the thickness of the image reading unit 2 has been achieved by the present invention.

In this embodiment, it is structured that the adjustment of the condenser lens can be done from above the condenser lens 27. As the optical paths L3 and L7 are disposed below the condenser lens 27 (and the linear optical path L1), the adjustment can be done without interrupting the optical paths.

Incidentally, the unit may be structured such that the condenser lens is adjusted from below the condenser lens, and the optical path from the forward side of the condenser lens toward the rearward and the optical path from the rearward side of the condenser lens toward the forward side may be formed above the condenser lens. However, from the adjustment point of view, the structure as in the embodiment of the invention is preferable.

Also, in the embodiment, the single reflecting mirror 20 constitutes the reflecting mirror (the first reflecting means) for receiving the light reflected from the document 102, and the reflecting mirror (the second reflecting means) for receiving the light reflected by the reflecting mirrors 21, 22, 23 to reciprocate therebetween and for reflecting the received light toward the final reflecting means (the reflecting mirror 24). Therefore, the size of the unit in the embodiment can be further reduced as compared with the case of providing separate reflecting mirrors as the first reflecting means and the second reflecting means.

Hereunder, the second embodiment of the invention will be explained regarding only features different from those in the first embodiment.

Now, an image reading unit according to the second embodiment of the invention will be explained with reference to the drawings.

Figure 4:
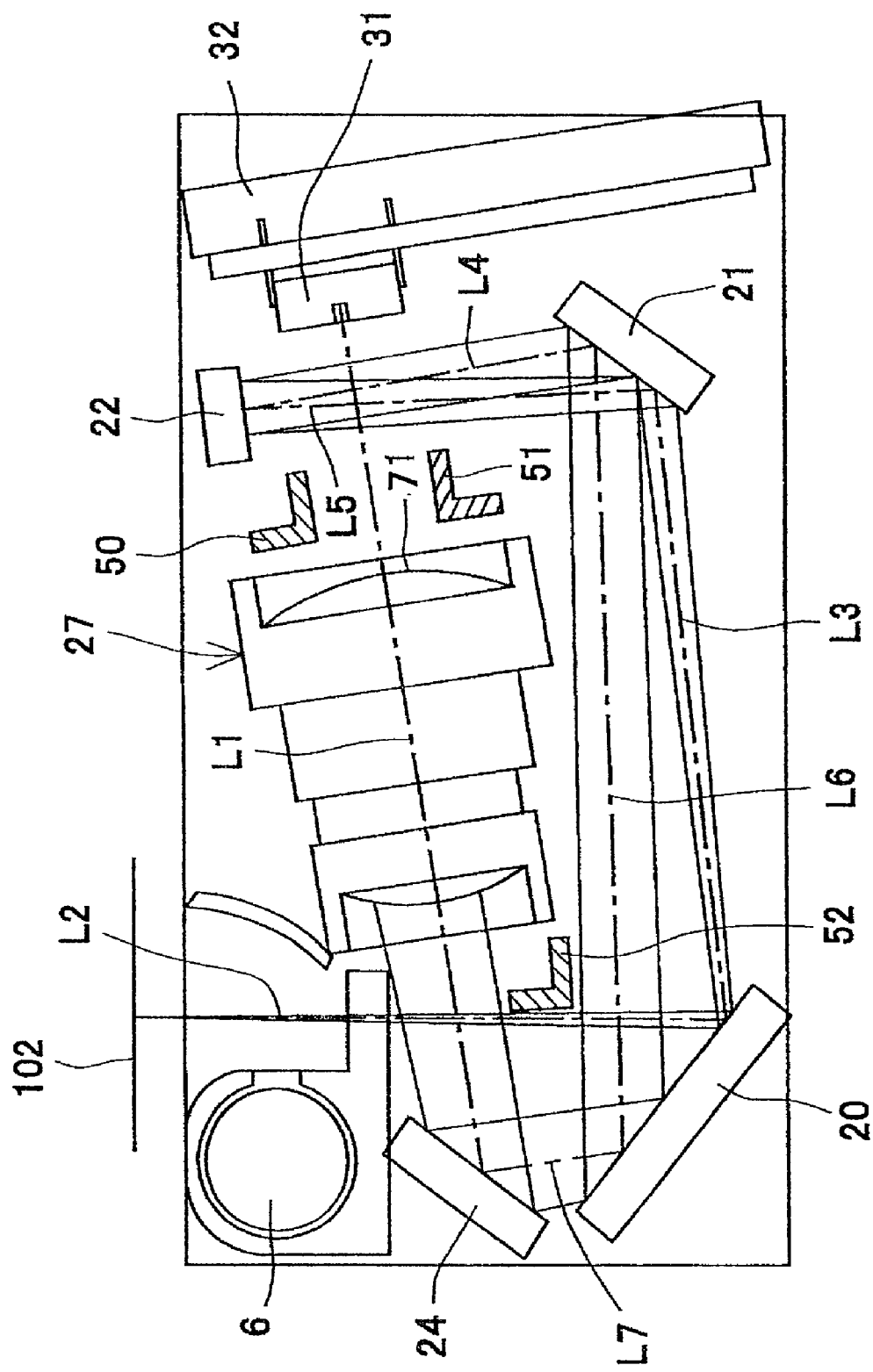
FIG. 4 is a sectional view schematically showing an image reading unit according to the second embodiment of the present invention.

FIG. 4 is a schematic sectional view showing the image reading unit according to the second embodiment of the invention. As shown in FIG. 4, the image reading unit of the second embodiment includes a light source 6; a reflecting mirror 20 (the first and second reflecting means); a reflecting mirror 21 (the third reflecting means); a reflecting mirror 22 (the fourth reflecting means); a reflecting mirror 24 (final reflecting means); a condenser lens 27, an image sensor 31; and a sensor board 32 supporting the image sensor 31. In the image reading unit of the second embodiment, a reflected light (an image light) from the document 102 illuminated by the light source 6 is incident on the condenser lens 27 through the reflecting mirrors 20, 21, 22, 24, and the image light is incident on the image sensor 31.

As in the first embodiment, the reflecting mirror 24 as the final reflecting means receives the light from the document 102 through the reflection by the reflecting mirrors 20, 21, 22, and reflects the received light toward the image sensor 31 disposed at a rearward side of the light outgoing surface 71. Then, the image light reflected by the reflecting mirror 24 passes through the condenser lens 27, and is condensed or focused (image-formed) to be incident on the image sensor 31. Incidentally, a straight, linear optical path L1 that does not bend is formed between the reflecting mirror 24 and the image sensor 31.

The reflecting mirrors 21, 22 are disposed between the condenser lens 27 and the sensor board 32 such that the reflecting mirrors 21, 22 are facing each other with the linear optical path L1 therebetween. A reciprocating optical path formed of the optical paths L4 and L5 is formed between the reflecting mirrors 21, 22, and the optical paths L4 and L5 cross the linear optical path L1 at a space between the condenser lens 27 and the image sensor 31. Therefore, as in the first embodiment, the reflected optical path is formed between the condenser lens 27 and the image sensor 31, so that a space for an additional optical path is not required, resulting in a smaller size, especially a thinner thickness, of the image reading unit.

Incidentally, in the second embodiment, the reciprocating optical path is formed of the optical path L4 proceeding from the side below the linear optical path L1 toward the side above the linear optical path L1, and the optical path L5 proceeding from the side above the linear optical path L1 toward the side below the linear optical path L1. However, depending on a requirement in the optical path length, it may be structured that the light reciprocates the reciprocating path several times.

Then, the image light from the document 102 illuminated by the light source 6 proceeds straight downward in a vertical direction, and is incident on the reflecting mirror 20 disposed a forward side of the condenser lens 27 and below the linear optical path L1. The image light reflected by the reflecting mirror 20 proceeds straight under the condenser lens 27 in a direction substantially parallel to the linear optical path L1, and is incident on the reflecting mirror 21 disposed between the light outgoing surface 71 of the condenser lens 27 and the sensor board 32 and under the linear optical path L1. The image light reflected by the reflecting mirror 21 is incident on the reflecting mirror 22, which is disposed between the light outgoing surface 71 of the condenser lens 27 and above the linear optical path L1 and opposed to the reflecting mirror 21 across the linear optical path L1, and again reflected by the reflecting mirror 22 toward the reflecting mirror 21. The image light incident on the reflecting mirror 21 proceeds straight under the condenser lens 27 in a direction substantially parallel to the linear optical path L1, and is incident on the reflecting mirror 20. Then, the light incident is reflected by the reflecting mirror 20 toward the reflecting mirror 24 as the final reflecting means. The image light incident on the reflecting mirror 24 is incident on the image sensor 31 through the condenser lens 27.

Also, two shielding members 50, 51 are respectively disposed at a space between the optical paths L4, L5 and the condenser lens 27, and between the optical lens 27 and the image sensor 31. The shielding member 50 prevents an undesired light, such as an outside light and a scattered light mainly generated by the reflecting mirror 22 and the condenser lens 27, from being incident on the image sensor 31. The shielding member 51 prevents the scattered light, which is mainly generated by the reflecting mirror 21 and the condenser light 27, from being incident on the image sensor 31. Although the image sensor 31 is not provided with the shielding member in the second embodiment, by providing the shielding member as in the same manner as in the first embodiment, the undesired lights can be more effectively prevented from being incident on the image sensor.

Now, an image reading apparatus according to the present invention to which the image reading unit 2 of the first embodiment is applied will be explained in detail with reference to the drawings.

Figure 6:
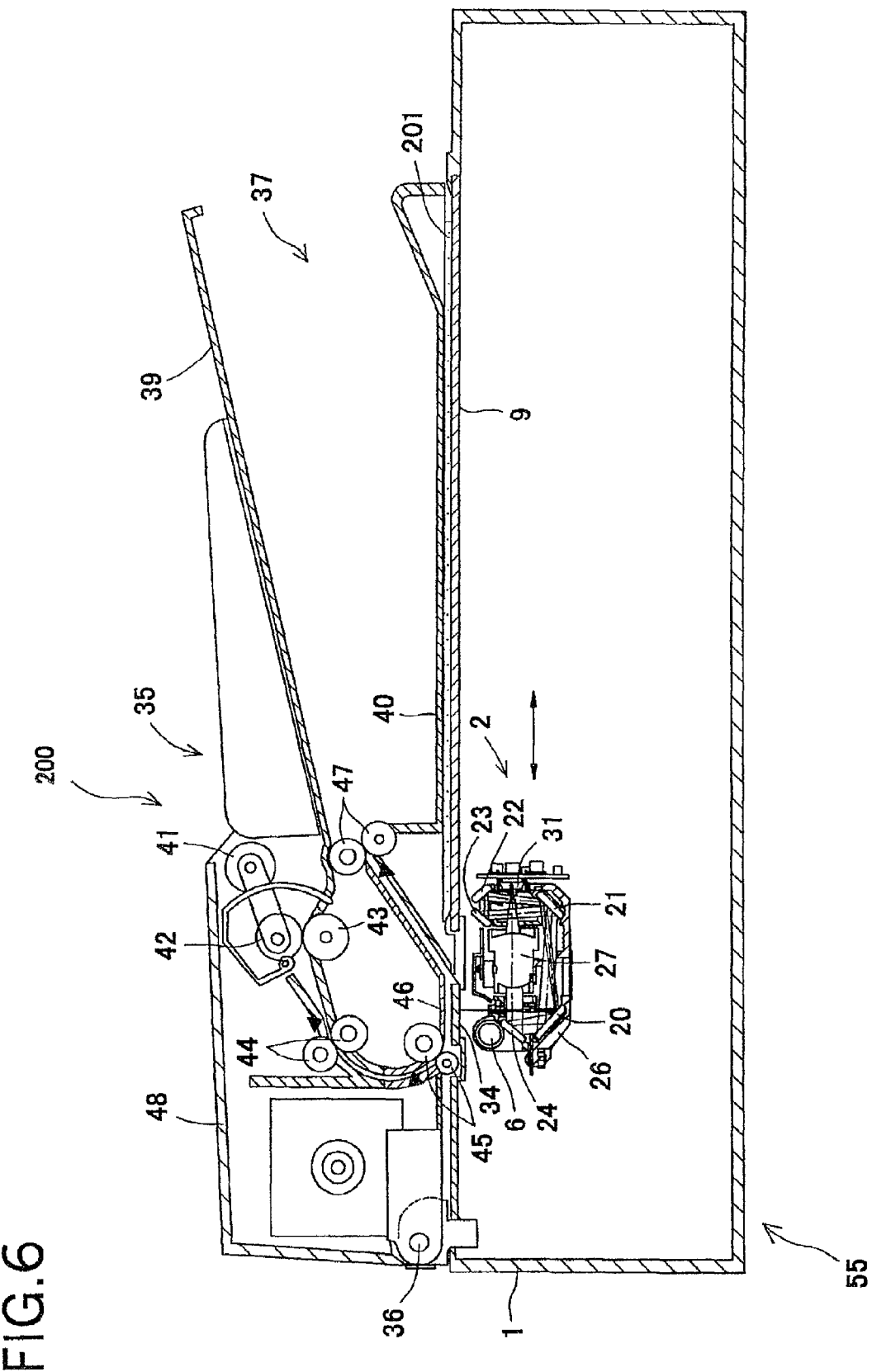
FIG. 6 is a sectional view showing an entire image reading apparatus according to the present invention.
Figure 7:
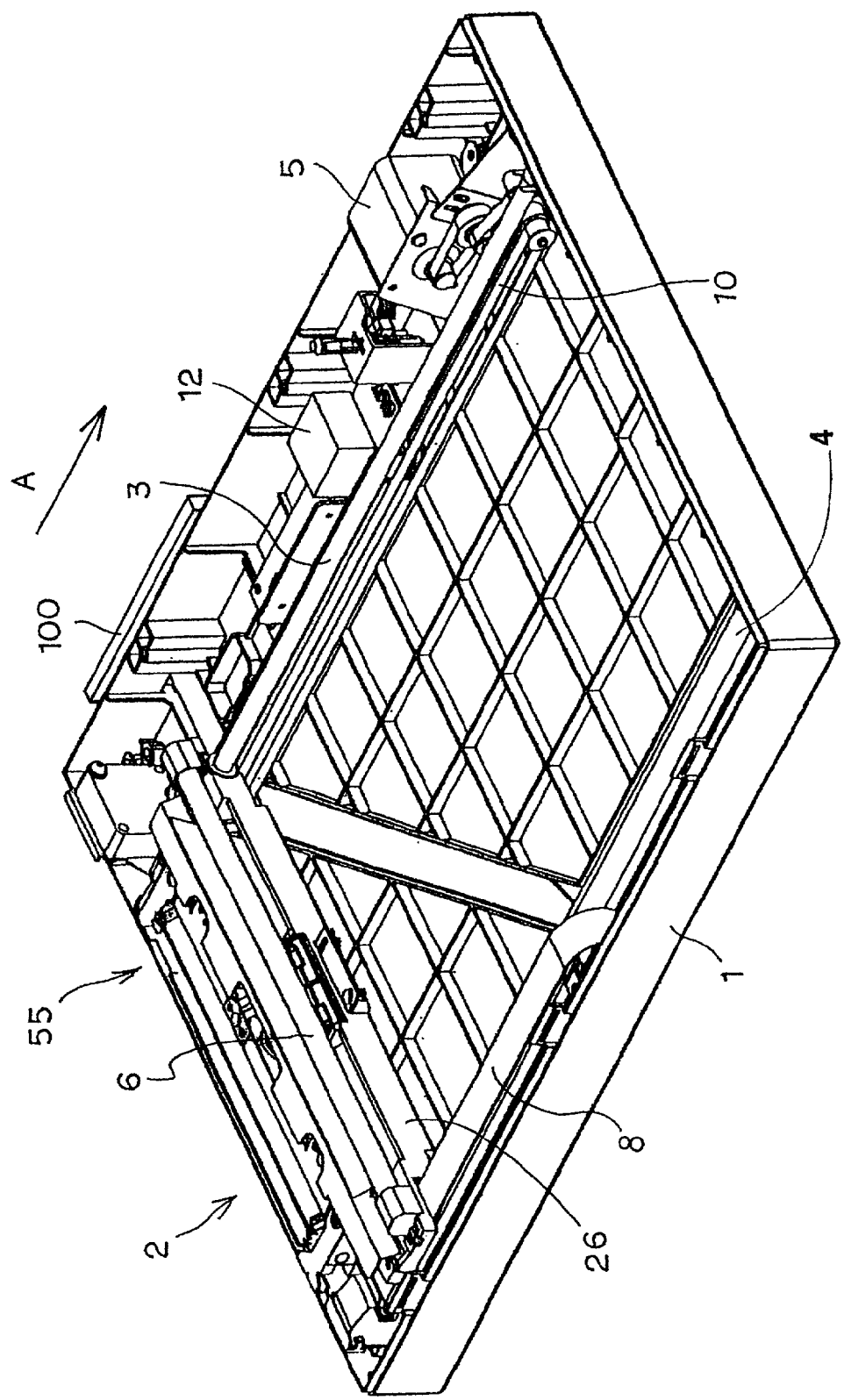
FIG. 7 is a perspective view showing the inside of the image reading apparatus of the invention.
Figure 8:
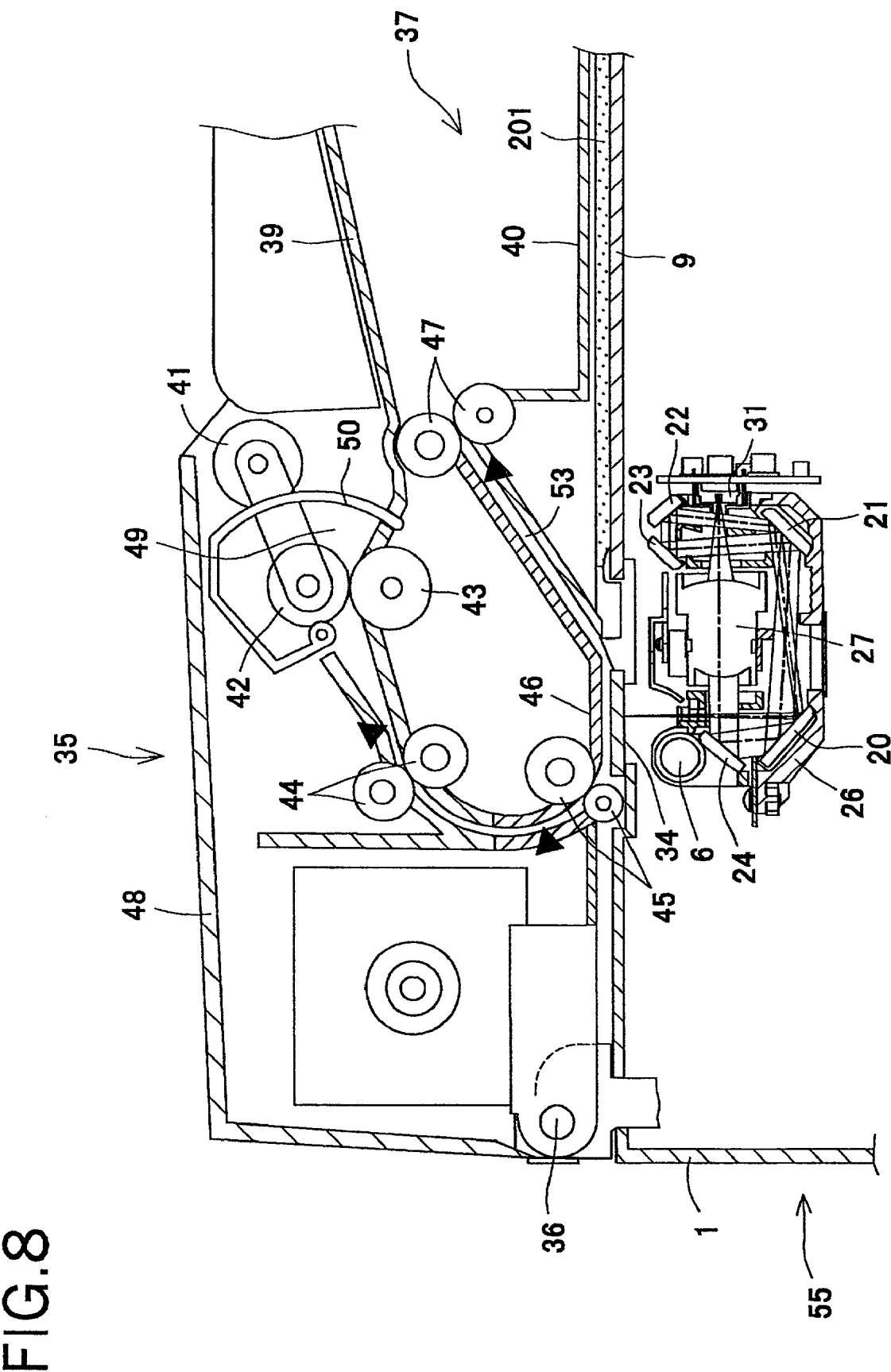
FIG. 8 is a sectional view showing a transferring mechanism of the image reading apparatus of the invention and an automatic document feeder.

FIG. 6 is a sectional view showing an image reading apparatus 55 to which an automatic document feeder (hereinafter referred to as "ADF") 200 is attached. FIG. 7 is a perspective view showing the inside of the image reading apparatus 55. FIG. 8 is an enlarged sectional view of the ADF 200.

As shown in FIG. 6, in the image reading apparatus 55, the image reading unit 2 of the first embodiment is accommodated inside a box-like main body frame 1 formed of a resin or a metal. An upper surface of the main body frame 1 is provided with a book platen 9, on which a thick document, such as a book, is placed to read the image thereon, and a sheet-through platen 34 for reading a sheet document transferred by the ADF 200. The book platen 9 and the sheet-through platen 34 are respectively formed of transparent members, such as a sheet of glass, and fixed to opening sections formed on the upper surface of the main body frame 1 by mounting means such as screws. Further, the ADF 200 is attached to an upper surface of the image reading apparatus 55 by a hinge 36 such that the ADF 200 is freely capable of opening and closing.

As shown in FIG. 7, the image reading apparatus 55 includes a guide rod 3 and a guide rail 4 as guiding means fixed to the main body frame 1. A part of the unit frame 26 is fitted with the guide rod 3 so that the guide rod 3 supports the image reading unit 2. Guided by the guide rod 3 and the guide rail 4, and driven by a driving belt 10 connected to the stepping motor 5, the image reading unit 2 is capable of sliding back and forth along an upper surface (the book platen 9) of the main body frame 1. Also, the image data read by the image reading unit 2 is sent from the sensor board 32 to a control board 100 through a signal cable 8. Then, various types of image processing are carried out in the control board 100, and the image data is further transferred to a higher-level apparatus, such as a printer, personal computer, or copier.

As shown in FIG. 6 and FIG. 8, the ADF 200 includes sheet supply means for feeding out the document on a sheet supply tray 39 one by one to supply the document in a predetermined feeding direction; transfer means for transferring the document fed from the sheet supply means to pass through a space on the platen in an image reading section located below the sheet supply tray 39; and sheet discharge means for discharging the document to a sheet discharge tray 40 after passing through the space on the platen.

The sheet supply means is formed of the sheet supply tray 39 for stacking and storing the document sheets thereon; a feeding roller 41 for feeding out the document sheet from the sheet supply tray 39; a sheet supply roller 42 for supplying the document sheet fed by the feeding roller 41 to a sheet supply path; separating means including register rollers 44 and a separation roller 43 for separating the document sheet one by one and feeding out the separated document sheet; and the sheet supply path in which the document sheet proceeds. Also, the transfer means constitutes a structure, in which a transfer path for transferring the document sheet is provided and a pair of transfer rollers 45 transfers the document sheet to a reading position 46. The sheet discharge means constitutes a structure, in which after reading the document sheet, the sheet discharge rollers 47 discharges the document sheet to the sheet discharge tray 40. The sheet supply means, transfer means and sheet discharge means are driven by a plurality of driving motors.

After the document sheets fed out from the sheet supply tray 39 by the rotation of the feeding roller 41 are separated into one sheet by the sheet supply roller 42 and the separation roller 43, the separated document sheet is transferred to a downstream side by the rotation of the register rollers 44. Then, the document sheet is transferred by the rotation of a pair of the transfer rollers 45 to pass through the space on the sheet-through platen 34. Thereafter, the transferred document sheet is discharged on the sheet discharge tray 40 by the rotation of the sheet discharge rollers 47.

In the case of reading a document 201 placed on the book platen 9, as shown in FIG. 6, while the image reading unit 2 is moved along the book platen 9 in the right direction of the arrow shown in FIG. 6, the light source 6 illuminates the image surface of the document 201. The image light reflected by the image surface of the document 201 is reflected several times by the reflecting mirrors 20, 21, 22, 23, 24. Then, the reflected image light is incident on the image sensor 31 through the condenser lens 27, and is subjected to the photoelectric conversion. In the sensor board 32, a process, such as the conversion to digital data, is applied to the image data converted from the light by the photoelectric conversion. Thereafter, the image data is transferred to the control board 100 through the signal cable 8. Incidentally, the moving direction of the image reading unit 2 is not limited to the right direction of the arrow in FIG. 6, and may be the left direction of the arrow.

In the case of reading the document transferred by the ADF 200, as shown in FIG. 6, the image reading unit 2 stays at the reading position below the sheet-through platen 34, and the image surface of the document sheet transferred by the ADF 200 is illuminated by the light source 6. Then, the image light reflected by the image surface of the document sheet is reflected several times by the reflecting mirrors 20, 21, 22, 23, 24. Thereafter, the reflected light is incident on the image sensor 31 through the condenser lens 27, and is subjected to the photoelectric conversion. In the sensor board 32, a process such as the conversion to the digital data is applied to the image data converted by the photoelectric conversion. Then, the image data is transferred to the control board 100 through the signal cable 8.

As described above, according to the present invention, the image reading unit is formed of the light source for illuminating the document, a plurality of the reflecting means for reflecting the light from the document, the condensing means for condensing the light reflected by a plurality of the reflecting means, and the reading means disposed at the condensing position of the condensing means. In the image reading unit, a plurality of the reflecting means includes the final reflecting means, which is disposed ahead of the incident surface of the condensing means and reflects the light from the document toward the condensing means, to thereby form the linear optical path passing through the condenser lens and located between the reading means and the final reflecting means. A plurality of the reflecting means also includes the reciprocating reflecting means for forming at least one reciprocating optical path crossing the linear optical path in the space between the condensing means and the reading means. Therefore, it is not necessary to provide an additional separate space for providing a bending or winding optical path, so that the size of the image reading unit can be reduced.

Also, since the light source is disposed ahead of the incident surface of the condensing means, the condensing means is located between the light source and the reading means. Therefore, the light from the light source is not incident on the reading means, so that the excellent image data can be obtained.

When the reciprocating path is provided between the condensing means and the reading means, the undesired light affecting the image quality may be increasingly incident on the light receiving section of the reading means. Therefore, at least one shielding member for preventing the undesired light from being incident on the light receiving section of the reading means is arranged between the condensing means and the reading means, or the shielding means for covering the light receiving surface of the reading means is provided, to thereby reduce the possibility of the undesired light being incident on the light receiving section of the reading means. Accordingly, the excellent image data can be obtained.

While the invention has been explained with reference to the specific embodiments of the invention, the explanation is illustrative and the invention is limited only by the appended claims.

What is claimed is:

1. An image reading unit for reading an image on a document, comprising:

a light source for irradiating light to the document, condensing means for receiving the light reflected at the document and condensing the same to a focal point, reading means disposed at the focal point of the condensing means for receiving the light therefrom, and a plurality of reflecting means for reflecting the light from the document and providing the light to the reading means through the condensing means, said reflecting means including final reflecting means located at a side opposite to the reading means relative to the condensing means for providing the light from the document toward the reading means through the condensing means to form a linear optical path between the final reflecting means and the reading means, and reciprocating reflecting means located at a side opposite to the light source relative to the condensing means for reflecting the light from the document to transfer to the final reflecting means, said reciprocating reflecting means forming at least one reciprocating optical path crossing the linear optical path between the condenser means and the reading means, first reflecting means disposed above or below the linear optical path for reflecting the light from the document along a first optical path substantially parallel to the linear optical path and providing the light to the reciprocating reflecting means, and second reflecting means disposed at a side same as that of the first reflecting means for reflecting the light from the reciprocating reflecting means passing along a second optical path substantially parallel to the linear optical path toward the final reflecting means.

2. An image reading unit according to claim 1, further comprising:

at least one shielding member disposed between the condensing means and the reading means for preventing undesired light from entering the reading means.

3. An image reading unit according to claim 2, further comprising a cover member disposed adjacent to the reading means for covering the reading means.

4. An image reading unit according to claim 1, wherein said reflecting means further comprises third reflecting means disposed at a side same as that of the first reflecting means for reflecting the light from the first reflecting means, and fourth reflecting means disposed at a side opposite to the third reflecting means across the linear optical path to receive the light from the third reflecting means and reflecting the same to the second reflecting means through the third reflecting means, said third reflecting means and said fourth reflecting means forming the reciprocating reflecting means and an optical path therebetween crossing the linear optical path between the condensing means and said reading means.

5. An image reading unit according to claim 4, wherein said third reflecting means and said fourth reflecting means are disposed in a space between the condensing means and the reading means.

6. An image reading unit according to claim 4, wherein said first reflecting means, said second reflecting means and said third reflecting means are disposed below the linear optical path.

7. An image reading unit according to claim 6, wherein said first reflecting means and said second reflecting means are formed of a single member.

8. An image reading unit according to claim 4, wherein said reflecting means further comprises fifth reflecting means formed at a side opposite to the third reflecting means, said fourth reflecting means reflecting the light from the third reflecting means toward the fifth reflecting means, said fifth reflecting means reflecting the light from the fourth reflecting means toward the second reflecting means through the third reflecting means, the fifth reflecting means and the third reflecting means forming an optical path crossing the linear optical path between the condensing means and the reading means.

9. An image reading unit according to claim 8, wherein said third reflecting means, said fourth reflecting means and said fifth reflecting means are disposed in a space between the condensing means and the reading means.

10. An image reading unit according to claim 8, wherein said first reflecting means, said second reflecting means and said third reflecting means are disposed below the linear optical path.

11. An image reading unit according to claim 10, wherein said first reflecting means and said second reflecting means are formed of a single member.

12. An image reading unit for reading an image on a document, comprising: a light source for irradiating light to the document, condensing means for receiving the light reflected at the document and condensing the same to a focal point, reading means disposed at the focal point of the condensing means for receiving the light therefrom, supporting means attached to the reading means for supporting the same, final reflecting means disposed adjacent to the condensing means for reflecting the light from the document and providing the same to the reading means through the condensing means, said final reflecting means forming a linear optical path between the final reflecting means and the reading means passing through the condensing means, and a plurality of reflecting means for reflecting the light from the document and providing the light to the final reflecting means; said reflecting means including first reflecting means, second reflecting means, third reflecting means, and fourth reflecting means; said first reflecting means disposed below the final reflecting means, said second reflecting means disposed below the linear optical path and in a space between the condensing means and the supporting means, said third reflecting means disposed above the linear optical path and in the space between the condensing means and the supporting means, said fourth reflecting means disposed above the linear optical path and in the space between the condensing means and the supporting means, said fourth reflecting means located next to the second reflecting means; said first reflecting means reflecting the light from the document toward the second reflecting means, said second reflecting means reflecting the light from the first reflecting means toward the third reflecting means, said third reflecting means reflecting the light from the second reflecting means toward the fourth reflecting means, said fourth reflecting means reflecting the light from the third reflecting means toward the second reflecting means, said second reflecting means reflecting the light from the fourth reflecting means toward the first reflecting means, said first reflecting means reflecting the light from the second reflecting means toward the final reflecting means.

13. An image reading apparatus for reading the image on the document, comprising a platen for supporting the document thereon, and said image reading unit according to claim 1 for reading the image on the document located on the platen.

* * * * *